US007779294B2

(12) United States Patent
Corrado et al.

(10) Patent No.: US 7,779,294 B2
(45) Date of Patent: Aug. 17, 2010

(54) POWER-SAFE DISK STORAGE APPARATUS, SYSTEMS, AND METHODS

(75) Inventors: Francis R. Corrado, Newton, MA (US); Daniel Nemiroff, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 529 days.

(21) Appl. No.: 11/107,396

(22) Filed: Apr. 15, 2005

(65) Prior Publication Data

US 2006/0236029 A1    Oct. 19, 2006

(51) Int. Cl.
*G06F 11/00* (2006.01)
(52) U.S. Cl. .......................................... 714/6; 711/114
(58) Field of Classification Search .................. 714/6; 711/114
See application file for complete search history.

(56) References Cited

U.S. PATENT DOCUMENTS

| | | | | |
|---|---|---|---|---|
| 5,305,326 A | * | 4/1994 | Solomon et al. ................ 714/6 |
| 5,452,444 A | | 9/1995 | Solomon et al. |
| 5,488,731 A | * | 1/1996 | Mendelsohn ................ 711/114 |
| 5,497,457 A | * | 3/1996 | Ford ............................... 714/6 |
| 5,522,032 A | * | 5/1996 | Franaszek et al. .............. 714/6 |
| 5,574,882 A | | 11/1996 | Menon et al. |
| 5,583,876 A | * | 12/1996 | Kakuta ........................ 714/766 |
| 5,774,643 A | | 6/1998 | Lubbers et al. |
| 5,778,426 A | | 7/1998 | DeKoning et al. |
| 5,787,460 A | | 7/1998 | Yashiro et al. |
| 5,864,655 A | * | 1/1999 | Dewey et al. ................... 714/7 |
| 5,911,779 A | | 6/1999 | Stallmo et al. |
| 5,948,110 A | * | 9/1999 | Hitz et al. ....................... 714/6 |
| 5,958,067 A | * | 9/1999 | Kaneda et al. .................. 714/6 |
| 5,959,860 A | | 9/1999 | Styczinski |
| 6,041,423 A | | 3/2000 | Tsukerman |
| 6,067,635 A | * | 5/2000 | DeKoning et al. ............. 714/6 |

(Continued)

FOREIGN PATENT DOCUMENTS

WO    WO-2006/113823  A2    10/2006

(Continued)

OTHER PUBLICATIONS

Stodolsky, D.; Gibson, G.; Holland, M., "Parity Logging Overcoming The Small Write Problem In Redundant Disk Arrays," Computer Architecture, 1993. Proceedings of the 20th Annual International Symposium on , vol., no., pp. 64-75, May 16-19, 1993.*

(Continued)

*Primary Examiner*—Robert Beausoliel
*Assistant Examiner*—Joshua P Lottich
(74) *Attorney, Agent, or Firm*—Schwegman, Lundberg & Woessner, P.A.

(57) ABSTRACT

Apparatus, systems, methods, and articles, operate to create a log file in a non-volatile data storage medium. The log file includes a header record, a trailer record, and at least one partial parity value associated with a stripe in a redundant array of inexpensive disks (RAID) sub-system. The stripe includes a first data strip to be updated, the first data strip located on an operational first disk drive, a second data strip located on a failed disk drive, and a stripe parity strip located on an operational disk drive, among others.

28 Claims, 3 Drawing Sheets

U.S. PATENT DOCUMENTS

| | | | |
|---|---|---|---|
| 6,073,218 | A | 6/2000 | DeKoning et al. |
| 6,334,168 | B1 | 12/2001 | Islam et al. |
| 6,523,087 | B2 * | 2/2003 | Busser ........................ 711/114 |
| 6,671,782 | B1 * | 12/2003 | Menon ........................ 711/145 |
| 6,766,491 | B2 * | 7/2004 | Busser ........................ 714/770 |
| 6,826,711 | B2 * | 11/2004 | Moulton et al. ................. 714/6 |
| 6,950,901 | B2 * | 9/2005 | Chiu et al. ................... 711/114 |
| 6,988,219 | B2 * | 1/2006 | Hitz et al. ....................... 714/6 |
| 7,055,058 | B2 * | 5/2006 | Lee et al. ........................ 714/7 |
| 7,065,674 | B2 * | 6/2006 | Cabrera et al. ................. 714/16 |
| 7,080,278 | B1 * | 7/2006 | Kleiman et al. ................. 714/6 |
| 7,197,599 | B2 | 3/2007 | Corrado et al. |
| 7,237,062 | B2 * | 6/2007 | Lubbers et al. .............. 711/114 |
| 7,246,259 | B2 * | 7/2007 | Subbarao et al. ................ 714/6 |
| 7,257,732 | B2 * | 8/2007 | Zarnke et al. ................... 714/6 |
| 2001/0002480 | A1 | 5/2001 | DeKoning et al. |
| 2003/0041211 | A1 | 2/2003 | Merkey et al. |
| 2005/0144381 | A1 | 6/2005 | Corrado |
| 2006/0282700 | A1 | 12/2006 | Cavallo |
| 2006/0288161 | A1 | 12/2006 | Cavallo |
| 2007/0028044 | A1 | 2/2007 | Hetrick et al. |

FOREIGN PATENT DOCUMENTS

| | | | |
|---|---|---|---|
| WO | WO-2006113823 | A1 | 10/2006 |

OTHER PUBLICATIONS

Hai Jin; Xinrong Zhou; Dan Feng; Jiangling Zhang, "Improving partial stripe write performance in RAID level 5," Devices, Circuits and Systems, 1998. Proceedings of the 1998 Second IEEE International Caracas Conference on , vol., no., pp. 396-400, Mar. 2-4, 1998.*

"Intel® 80303 I/O Processor", *Datasheet*, (Jun. 2002), 56 pgs.

"PCI Local Bus Specification", *Revision 2.3*, PCI Special Interest Group, Portland, OR, (Mar. 29, 2002), 328 pgs.

Deyring, K.-P., "Serial ATA: High Speed Serialized AT Attachment", *Revision 1.0*, (Aug. 29, 2001), 307 pgs.

Elliott, R. C., "Information Technology—Serial Attached SCSI (SAS)", *Working Draft, American National Standard—Project T10/ 1562-D (Revision 5)*, (Jul. 9, 2003), 464 pgs.

Nelson, J., "Fibre Channel—Framing and Signaling (FC-FS)", *FC-FS Draft Standard, Rev. 1.90*, (Apr. 9, 2003), 64 pgs.

Patterson, D. A., et al., "A Case for Redundant Arrays of Inexpensive Disks (RAID)", *ACM SIGMOD International Conference on Management of Data*, (Jun. 1998), 109-116.

"U.S. Appl. No. 11/155,295, Non-Final Office Action mailed Dec. 12, 2007", 14 pgs.

"International Application Serial No. PCT/US2006/014772, Search Report mailed Jan. 29, 2009" 6 pgs.

"International Application Serial No. PCT/US2006/014772, Written Opinion mailed Jan. 29, 2009" 5 pgs.

\* cited by examiner

POWER-SAFE DISK STORAGE APPARATUS, SYSTEMS, AND METHODS

TECHNICAL FIELD

Various embodiments described herein relate to disk storage technology generally, including apparatus, systems, and methods used to restore parity consistency in redundant arrays following power loss.

BACKGROUND INFORMATION

A disk storage system may include a redundant array of inexpensive disks (RAID) sub-system. The RAID sub-system may store an aggregation of data referred to as a "strip" located on each of several data disk drives included in the RAID sub-system. Each strip from each of the data disk drives may be related to the others by a parity strip located on one of the several data disk drives or on a separate parity disk drive. The parity strip and the related data strips may be referred to collectively as a "stripe."

The parity strip may be calculated by performing an exclusive OR operation on the related data strips, and it may be used by the RAID sub-system together with the data strips to recalculate the value of a data strip that becomes unreadable at some time after writing the stripe. A redundancy may thus be incorporated into the RAID sub-system, and the redundancy may enable recovery of a volume following one or more disk drive failures ("degraded mode" of operation). A problem may arise, however, if a processor or controller performing a write update to a target data strip or to the parity strip resets unexpectedly while operating in the degraded mode. The unexpected reset could be triggered by a power loss or a fatal operating system error, for example. The parity strip may be inconsistent with the data strips in the stripe following the reset.

DETAILED DESCRIPTION

Figure 1:
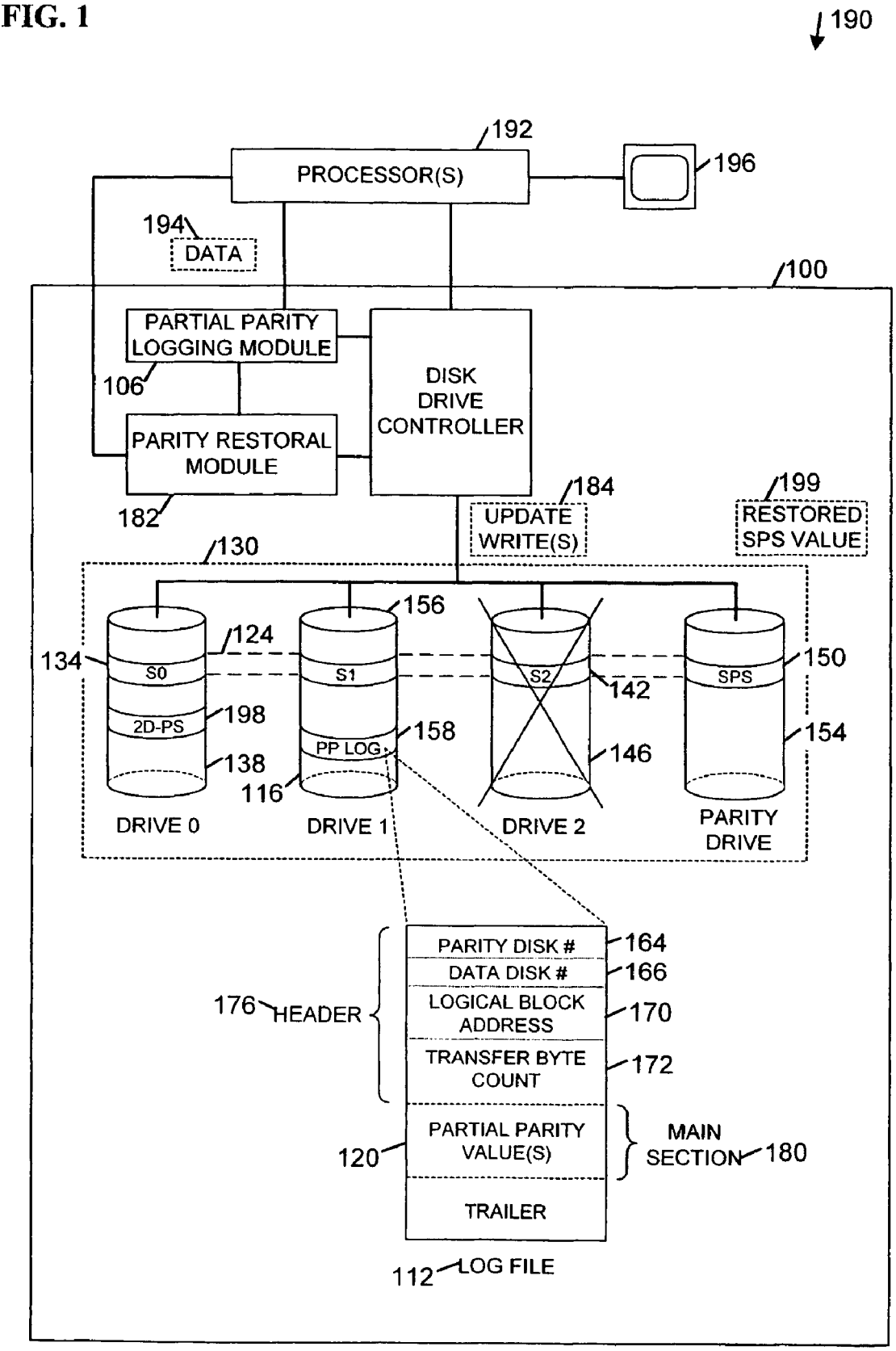
FIG. 1 is a block diagram of an apparatus and a representative system according to various embodiments of the invention.

FIG. 1 comprises a block diagram of an apparatus 100 and a system 190 according to various embodiments of the invention. The apparatus 100 may include a partial parity logging module 106 to create a log file 112 in a non-volatile data storage medium 116. The log file 112 may include one or more partial parity value(s) 120 associated with a stripe 124 in a RAID sub-system 130. The RAID sub-system 130 may comprise a RAID level 3, RAID level 4, RAID level 5, RAID level 6, RAID level 30, RAID level 50, or any other RAID or redundant disk array sub-system employing striped data and one or more parity values calculated from a set of data strips comprising the stripe.

The stripe 124 may comprise a first data strip 134 to be updated located on an operational first disk drive 138, a second data strip 142 located on a failed disk drive 146, and a stripe parity strip 150 located on an operational disk drive 154, among others. The partial parity value(s) 120 may comprise the result of an exclusive OR operation performed on the first data strip 134 and the stripe parity strip 150. The non-volatile data storage medium 116 may comprise a storage area on a disk drive 156, including a reserved area 158 located on one or more disk drive(s) included in the RAID sub-system 130.

The log file 112 may also include a parity disk number 164 associated with the stripe parity strip 150, and a data disk number 166, a logical block address 170, and a transfer byte count 172 associated with the first data strip 134. The latter parity and data strip location information may be found in a header section 176 of the log file; and the partial parity value (s) 120 may be found in a main section 180 of the log file. These values may identify disk drives to participate in parity restoral operations using partial parity value(s) from the log file.

The apparatus 100 may also include a parity restoral module 182 coupled to the logging module 106 to restore a consistency between the first data strip 134 and the stripe parity strip 150. Restoring the consistency may be required following an unexpected sub-system reset (e.g., a reset occurring between a time of initiating update writes 184 to the first data strip 134 and to the stripe parity strip 150 and a time of completing the update writes 184). The restoral may include performing an exclusive OR operation on the partial parity value(s) 120 obtained from the log file 112 and on the first data strip 134.

Other embodiments may be realized. For example, a system 190 may comprise one or more of the apparatus 100, including a partial parity logging module 106, a log file 112, and a non-volatile data storage medium 116. The latter may comprise a reserved area 158 located on one or more disk drives included in the RAID sub-system 130. The system 190 may also include one or more partial parity value(s) 120, a stripe 124, a first data strip 134, a stripe parity strip 150, a parity restoral module 182, and a RAID sub-system 130 as described for the apparatus 100. The RAID sub-system 130 may comprise a RAID level 3, RAID level 4, RAID level 5, RAID level 6, RAID level 30, RAID level 50, or any other RAID or redundant disk array sub-system employing striped data and one or more parity values calculated from a set of data strips comprising the stripe.

The system 190 may further include one or more processor (s) 192 coupled to the logging module 106 to provide data 194 to write to the first data strip 134, and a display 196 coupled to the processor 192 to display the data 194. The display 196 may comprise a cathode ray tube display, or a solid-state display such as a liquid crystal display, a plasma display, or a light-emitting diode display, among others.

Some embodiments of the system 190 may include a second-dimensional parity strip 198 located on an operational disk drive 138 within a RAID level 6 subsystem. The second-dimensional parity strip 198 may be calculated using the first data strip 134 and other data strips in the stripe 124, including perhaps all the others. The parity restoral module 182 may be used to restore a second consistency between the first data strip 134 and the second-dimensional parity strip 198 following an unexpected sub-system reset (e.g., an interruption of RAID sub-system processing without notification to the RAID sub-system prior to the interruption). A second-dimensional parity consistency restoral operation may include operations performed on a restored stripe parity strip value 199 and on the other data strips in the stripe 124.

Any of the components previously described can be implemented in a number of ways, including embodiments in software. Thus, the apparatus 100; partial parity logging module 106; log file 112; non-volatile data storage medium 116; partial parity value(s) 120; stripe 124; redundant array of inexpensive disks (RAID) sub-system 130; data strips 134, 142; disk drives 138, 146, 154, 156; stripe parity strip 150; reserved area 158; disk numbers 164, 166; logical block address 170; transfer byte count 172; sections 176, 180 of the log file; parity restoral module 182; update writes 184; system 190; processor(s) 192; data 194; liquid crystal display 196; second-dimensional parity strip 198; and restored stripe parity strip value 199 may all be characterized as "modules" herein.

The modules may include hardware circuitry, single or multi-processor circuits, memory circuits, software program modules and objects, firmware, and combinations thereof, as desired by the architect of the apparatus 100 and system 190 and as appropriate for particular implementations of various embodiments. Thus, the modules may be included in a system operation simulation package such as a software electrical signal simulation package, a power usage and distribution simulation package, a capacitance-inductance simulation package, a power/heat dissipation simulation package, a signal transmission-reception simulation package, or any combination of software and hardware used to simulate the operation of various potential embodiments. These simulations may be used to characterize or test the embodiments, for example.

It should also be understood that the apparatus and systems of various embodiments can be used in applications other than restoring stripe parity consistency in a degraded mode RAID volume following an unexpected reset. Thus, various embodiments of the invention are not to be so limited. The illustrations of apparatus 100 and system 190 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers, workstations, radios, video players, vehicles, and others. Some embodiments may include a number of methods.

Figure 2:
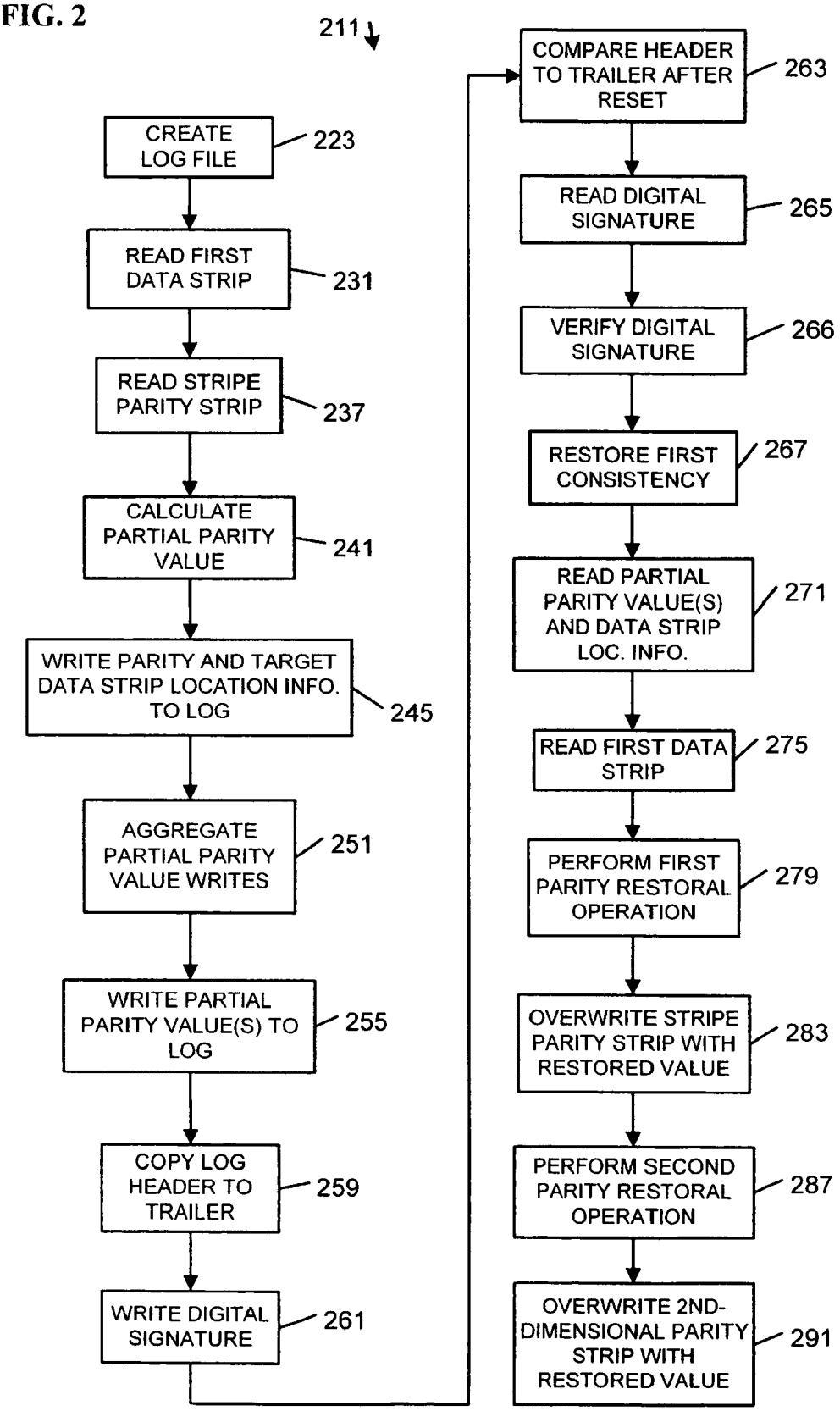
FIG. 2 is a flow diagram illustrating several methods according to various embodiments of the invention.

FIG. 2 is a flow diagram illustrating several methods 211 according to various embodiments of the invention. One such method 211 may begin at block 223 with creating a log file in a non-volatile data storage medium. The non-volatile data storage medium may comprise a reserved area located on one or more disk drives included in a RAID sub-system. The RAID sub-system may comprise a RAID level 3, RAID level 4, RAID level 5, RAID level 6, RAID level 30, RAID level 50, or any other RAID or redundant disk array sub-system employing striped data and one or more parity values calculated from a set of data strips comprising the stripe, as previously mentioned.

The log file may include a header record, a trailer record, and one or more partial parity value(s) associated with a stripe in the RAID sub-system. The stripe may comprise a first data strip to be updated located on an operational first disk drive, a second data strip located on a failed disk drive, and a stripe parity strip located on an operational disk drive, among others. The stripe parity strip may comprise a parity value calculated using the first data strip and additional data strips included in the stripe.

The method 211 may continue with reading the first data strip from the operational first disk drive, at block 231, and reading the stripe parity strip from the RAID sub-system, at block 237. The method 211 may also include calculating the one or more partial parity value(s) from the first data strip and the stripe parity strip, perhaps by performing an exclusive OR function on the first data strip and on the stripe parity strip, at block 241. The method 211 may further include writing a parity disk number, a data disk number, a logical block address, and a transfer byte count associated with the first data strip to the header record in the log file, at block 245.

The method 211 may continue at block 251 with aggregating writes of the partial parity value(s) to the log file to increase write throughput, and writing the partial parity value(s) to a main section of the log file, at block 255. The method 211 may also include copying the header record to the trailer record in the log file after writing the partial parity value(s) to the main section, at block 259, and writing a digital signature to the log file to be used to confirm that a header record from the log file is associated with the partial parity value(s), at block 261.

A set of updates to a set of data strips may be written to disk upon completing writes to the log file corresponding to the set of updates, including copying the log file header contents to the log file trailer section. A comparison of the header and trailer may thus provide an indication whether the set of data strip disk writes is in process or has not yet begun. The set of data strip disk writes may be considered to have started at some time after partial parity writes to the log file corresponding to the data strip update set are complete and the header contents are copied to the trailer section, making the header and trailer equal. Thus, if the header and trailer are not equal, the log file may be considered to be undergoing update, and the set of data strip writes may not have begun.

The method 211 may continue further at block 263 with comparing the header record to the trailer record following an unexpected sub-system reset to determine whether the reset has occurred between a time of initiating update writes to the first data strip and to the stripe parity strip and a time of completing the update writes. If parity consistency requires restoration, the method 211 may continue with reading a digital signature from the log file associated with the partial parity value(s) at block 265 and with verifying the digital signature to confirm that the header record from the log file is associated with the partial parity value(s), at block 266.

The method of claim 211 may also include restoring a first consistency between the first data strip and the stripe parity strip using the log file following the unexpected sub-system reset, at block 267. Restoring the first consistency may proceed with reading the partial parity value(s) and a set of stripe parity strip and first data strip location values from the log file at block 271. The method 211 may continue at block 275 with reading the first data strip from the operational first disk drive. The method 211 may include performing a first parity restoral operation, including perhaps an exclusive OR operation, on the partial parity value(s) and on the first data strip to obtain a restored stripe parity strip value, at block 279. The method 211 may also include overwriting the stripe parity strip with the restored stripe parity strip value, at block 283.

The log file may be created in a RAID level 6 sub-system wherein a second-dimensional parity strip is calculated using the first data strip. The method 211 may include performing a second parity restoral operation on the restored stripe parity strip value and on all data strips in the stripe to create a restored second-dimensional parity strip value, at block 287. The method 211 may conclude with overwriting the second-dimensional parity strip with the restored second-dimensional parity strip value, at block 291.

The methods described herein do not have to be executed in the order described, or in any particular order. Moreover, various activities described with respect to the methods identified herein can be executed in repetitive, serial, or parallel fashion. Information, including parameters, commands, operands, and other data, can be sent and received in the form of one or more carrier waves.

One of ordinary skill in the art will understand the manner in which a software program can be launched from a computer-readable medium in a computer-based system to execute the functions defined in the software program. Various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 3 below.

Figure 3:
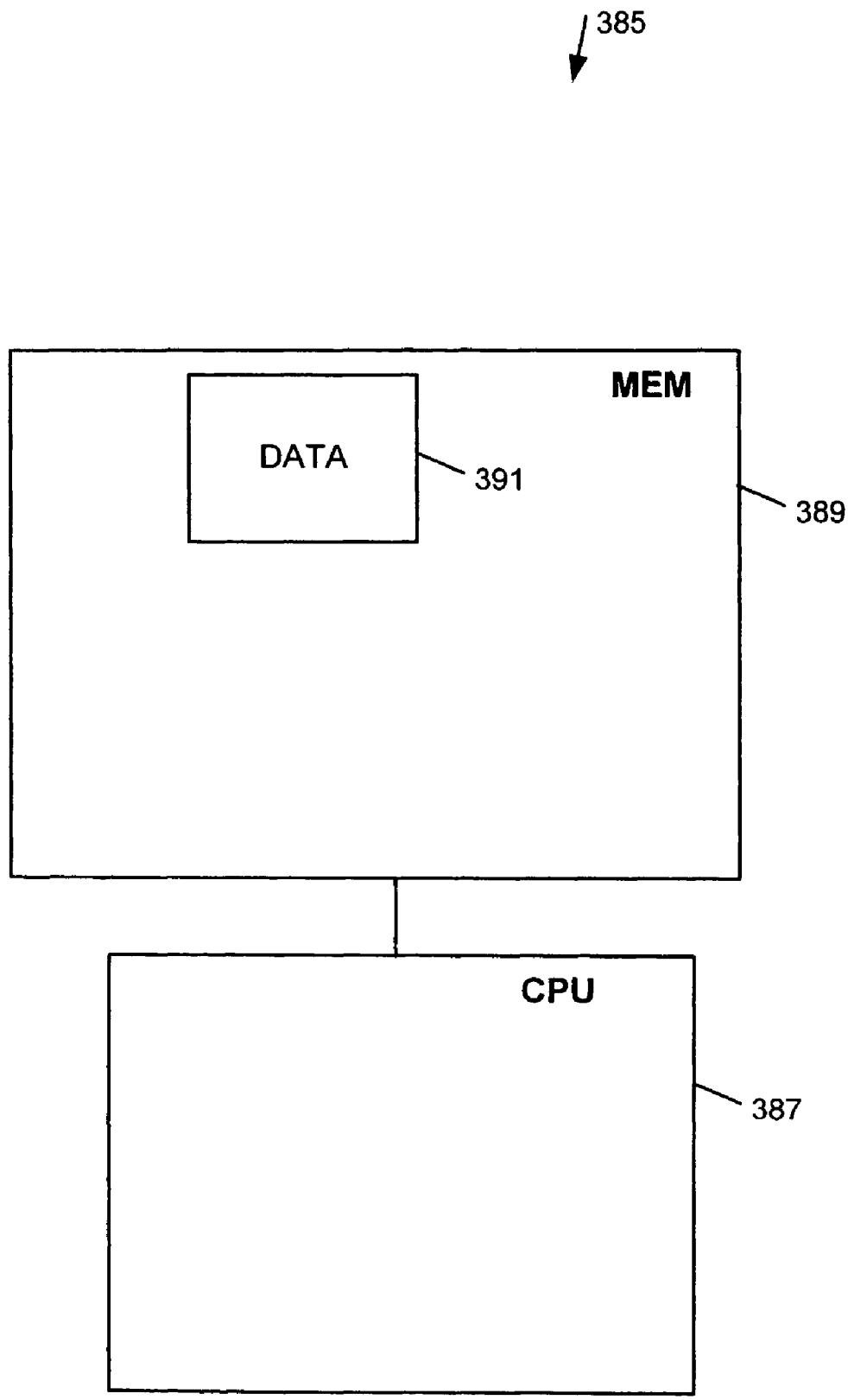
FIG. 3 is a block diagram of an article according to various embodiments of the invention.

FIG. 3 is a block diagram of an article 385 according to various embodiments of the invention. Examples of such embodiments may comprise a computer, a memory system, a magnetic or optical disk, some other storage device, or any type of electronic device or system. The article 385 may include one or more processor(s) 387 coupled to a machine-accessible medium such as a memory 389 (e.g., a memory including electrical, optical, or electromagnetic elements). The medium may contain associated information 391 (e.g., computer program instructions, data, or both) which, when accessed, results in a machine (e.g., the processor(s) 387) creating a log file in a non-volatile data storage medium, wherein the log file comprises a header record, a trailer record, and one or more partial parity value(s) associated with a stripe in a redundant array of inexpensive disks (RAID) sub-system. The stripe may comprise a first data strip to be updated located on an operational first disk drive, a second data strip located on a failed disk drive, and a stripe parity strip located on an operational disk drive.

Other activities may include reading the first data strip from the operational first disk drive, reading the stripe parity strip from the RAID sub-system, and calculating the partial parity value(s) from the first data strip and the stripe parity strip. Activities may also include writing a parity disk number, a data disk number, a logical block address, and a transfer byte count associated with the first data strip to a header record in the log file, and writing the partial parity value(s) to a main section of the log file. Further activities may include copying the header record to a trailer record in the log file after writing the partial parity value(s) to the main section, and writing a digital signature to the log file to be used to confirm that a header record from the log file is associated with the partial parity value(s).

Activities may also include comparing the header record to the trailer record following an unexpected sub-system reset to determine whether the reset has occurred during a period between a time of initiating update writes to the first data strip and to the stripe parity strip and a time of completing the update writes. Additional activities may include reading a digital signature from the log file associated with the partial parity value(s), and verifying the digital signature to confirm that the header record from the log file is associated with the partial parity value(s).

Further activities may include restoring a consistency between the first data strip and the stripe parity strip using the log file following the unexpected sub-system reset. These activities may include reading the partial parity value(s) and a set of stripe parity strip and first data strip location values from the log file. The activities may also include reading the first data strip from the operational first disk drive, performing a parity restoral operation on the partial parity value(s) and the first data strip to obtain a restored stripe parity strip value, and overwriting the stripe parity strip with the restored stripe parity strip value.

Implementing the apparatus, systems, and methods disclosed herein may operate to restore stripe parity consistency in a degraded mode RAID volume following an unexpected reset during an update to a data or parity strip associated with the stripe.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A method, including:

creating a log file in a non-volatile data storage medium, wherein the log file comprises a header record, a trailer record, and at least one partial parity value associated with a stripe in a redundant array of inexpensive disks (RAID) sub-system, and wherein the stripe comprises a first data strip to be updated located on an operational first disk drive, a second data strip located on a failed disk drive, and a stripe parity strip located on an operational disk drive, the at least one partial parity value being the result of an exclusive OR operation performed on the first data strip and the stripe parity strip, the at least one partial parity value being determined without regard to at least one data strip in the stripe; and performing a restoral including performing an exclusive OR operation on the at least one partial parity value obtained from the log file and on the first data strip.

2. The method of claim 1, further including:

reading the first data strip from the operational first disk drive;

reading the stripe parity strip from the RAID sub-system;

calculating the at least one partial parity value from the first data strip and the stripe parity strip;

writing a parity disk number, a data disk number, a logical block address, and a transfer byte count associated with the first data strip to the header record in the log file;

writing the at least one partial parity value to a main section of the log file; and copying the header record to the trailer record in the log file after writing the at least one partial parity value to the main section.

3. The method of claim 2, wherein calculating the at least one partial parity value comprises performing an exclusive OR function on the first data strip and on the stripe parity strip.

4. The method of claim 1, further including:

comparing the header record to the trailer record following an unexpected sub-system reset to determine whether the reset has occurred during a period between a time of initiating update writes to the first data strip and to the stripe parity strip and a time of completing the update writes.

5. The method of claim 4, further including:

restoring a first consistency between the first data strip and the stripe parity strip using the log file following the unexpected sub-system reset.

6. The method of claim 5, further including:

reading the at least one partial parity value and a set of stripe parity strip and first data strip location values from the log file;

reading the first data strip from the operational first disk drive;

performing a first parity restoral operation on the at least one partial parity value and the first data strip to obtain a restored stripe parity strip value; and overwriting the stripe parity strip with the restored stripe parity strip value.

7. The method of claim 6, further including:

creating the log file further providing that a second-dimensional parity strip calculated using the first data strip exists on the RAID sub-system and that the RAID sub-system comprises a RAID level 6 subsystem;

performing a second parity restoral operation on the restored stripe parity strip value and on all data strips in the stripe to create a restored second-dimensional parity strip value; and overwriting the second-dimensional parity strip with the restored second-dimensional parity strip value.

8. The method of claim 1, wherein the stripe parity strip comprises a parity value calculated using the first data strip and additional data strips included in the stripe.

9. The method of claim 1, wherein the non-volatile data storage medium comprises a reserved area located on at least one disk drive included in the RAID sub-system.

10. The method of claim 1, further including:

aggregating writes of the at least one partial parity value to the log file to increase write throughput.

11. An article including a machine-accessible medium having associated information, wherein the information, when accessed, results in a machine performing:

creating a log file in a non-volatile data storage medium, wherein the log file comprises a header record, a trailer record, and at least one partial parity value associated with a stripe in a redundant array of inexpensive disks (RAID) sub-system, and wherein the stripe comprises a first data strip to be updated located on an operational first disk drive, a second data strip located on a failed disk drive, and a stripe parity strip located on an operational disk drive, the at least one partial parity value being the result of an exclusive OR operation performed on the first data strip and the stripe parity strip, the at least one partial parity value being determined without regard to at least one data strip in the stripe, and performing a restoral including performing an exclusive OR operation on the at least one partial parity value obtained from the log file and on the first data strip.

12. The article of claim 11, wherein the information, when accessed, results in a machine performing:

reading the first data strip from the operational first disk drive;

reading the stripe parity strip from the RAID sub-system;

calculating the at least one partial parity value from the first data strip and the stripe parity strip;

writing a parity disk number, a data disk number, a logical block address, and a transfer byte count associated with the first data strip to a header record in the log file;

writing the at least one partial parity value to a main section of the log file; and copying the header record to a trailer record in the log file after writing the at least one partial parity value to the main section.

13. The article of claim 12, wherein the information, when accessed, results in a machine performing:

writing a digital signature to the log file to be used to confirm that a header record from the log file is associated with the at least one partial parity value.

14. The article of claim 11, wherein the information, when accessed, results in a machine performing:

comparing the header record to the trailer record following an unexpected sub-system reset to determine whether the reset has occurred during a period between a time of initiating update writes to the first data strip and to the stripe parity strip and a time of completing the update writes.

15. The article of claim 14, wherein the information, when accessed, results in a machine performing:

reading a digital signature from the log file associated with the at least one partial parity value; and verifying the digital signature to confirm that the header record from the log file is associated with the at least one partial parity value.

16. The article of claim 15, wherein the information, when accessed, results in a machine performing:

restoring a consistency between the first data strip and the stripe parity strip using the log file following the unexpected sub-system reset, wherein the reset occurs during the period between the time of initiating the update writes to the first data strip and to the stripe parity strip and the time of completing the update writes.

17. The article of claim 16, wherein the information, when accessed, results in a machine performing:
reading the at least one partial parity value and a set of stripe parity strip and first data strip location values from the log file;
reading the first data strip from the operational first disk drive;
performing a parity restoral operation on the at least one partial parity value and the first data strip to obtain a restored stripe parity strip value; and
overwriting the stripe parity strip with the restored stripe parity strip value.

18. An apparatus, including:
one or more processors;
a partial parity logging module executable by the one or more processors to create a log file in a non-volatile data storage medium, the log file comprising at least one partial parity value associated with a stripe in a redundant array of inexpensive disks (RAID) sub-system, the stripe comprising a first data strip to be updated located on an operational first disk drive, a second data strip located on a failed disk drive, and a stripe parity strip located on an operational disk drive, the at least one partial parity value being the result of an exclusive OR operation performed on the first data strip and the stripe parity strip, the partial parity value being determined without regard to at least one data strip in the stripe, and the partial parity logging module comprising at least one of a hardware module, a firmware module, or a software module stored on a computer readable medium; and
a parity restoral module executable by the one or more processors and coupled to the logging module to restore a consistency between the first data strip and the stripe parity strip by performing an exclusive OR operation on the at least one partial parity value obtained from the log file and on the first data strip.

19. The apparatus of claim 18, wherein the log file further comprises a parity disk number associated with the stripe parity strip, and a data disk number, a logical block address, and a transfer byte count associated with the first data strip.

20. The apparatus of claim 19, wherein the parity disk number, the data disk number, the logical block address, and the transfer byte count are located in a header section of the log file, and the at least one partial parity value is located in a main section of the log file.

21. The apparatus of claim 18, wherein the non-volatile data storage medium comprises a storage area on a disk drive.

22. The apparatus of claim 21, wherein the storage area comprises a reserved area located on at least one disk drive included in the RAID sub-system.

23. The apparatus of claim 18, further including:
a parity restoral module coupled to the logging module to restore a consistency between the first data strip and the stripe parity strip using the log file following an unexpected sub-system reset, the reset occurring during a period between a time of initiating update writes to the first data strip and to the stripe parity strip and a time of completing the update writes, the parity restoral module to restore the consistency by performing an exclusive OR operation on the partial parity values obtained from the log file and on the first data strip, and the parity restoral module comprising at least one of a hardware module, a firmware module, or a software module stored on a computer readable medium.

24. A system, including:
a partial parity logging module to create a log file in a non-volatile data storage medium, the log file comprising at least one partial parity value associated with a stripe in a redundant array of inexpensive disks (RAID) sub-system and the stripe comprising a first data strip to be updated located on an operational first disk drive, a second data strip located on a failed disk drive, and a stripe parity strip located on an operational disk drive, the at least one partial parity value being the result of an exclusive OR operation performed on the first data strip and the stripe parity strip, the partial parity value being determined without regard to at least one data strip in the stripe;
a parity restoral module coupled to the logging module to restore a first consistency between the first data strip and the stripe parity strip using the log file following an unexpected sub-system reset, the reset occurring during a period between a time of initiating update writes to the first data strip and to the stripe parity strip and a time of completing the update writes, the parity restoral module to restore the first consistency by performing an exclusive OR operation on the partial parity values obtained from the log file and on the first data strip;
a processor coupled to the logging module to provide data to write to the first data strip; and
a liquid crystal display coupled to the processor to display the data.

25. The system of claim 24, wherein the RAID sub-system comprises at least one of RAID level 3, RAID level 4, RAID level 5, RAID level 6, RAID level 30, or RAID level 50.

26. The system of claim 24, further comprising:
a second-dimensional parity strip located on an operational disk drive and calculated using the first data strip, wherein the RAID sub-system comprises a RAID level 6 subsystem, and wherein the parity restoral module is to restore a second consistency between the first data strip and the second-dimensional parity strip using a restored stripe parity strip and all data strips in the stripe.

27. The system of claim 24, wherein the non-volatile data storage medium comprises a reserved area located on at least one disk drive included in the RAID sub- system.

28. The system of claim 24, wherein the unexpected sub-system reset comprises an interruption of RAID sub-system processing without notification to the RAID sub-system prior to the interruption.

* * * * *

UNITED STATES PATENT AND TRADEMARK OFFICE
CERTIFICATE OF CORRECTION

PATENT NO.        : 7,779,294 B2                                    Page 1 of 1
APPLICATION NO. : 11/107396
DATED             : August 17, 2010
INVENTOR(S)       : Francis R. Corrado et al.

It is certified that error appears in the above-identified patent and that said Letters Patent is hereby corrected as shown below:

On the Title page, Item (57), "Abstract", line 1, delete "articles," and insert -- articles --, therefor.

In column 7, line 58, in Claim 7, delete "subsystem;" and insert -- sub-system; --, therefor.

In column 10, line 45, in Claim 26, delete "subsystem," and insert -- sub-system, --, therefor.

Signed and Sealed this

Twenty-third Day of November, 2010

David J. Kappos
*Director of the United States Patent and Trademark Office*